3,202,636
ISOCYANATO TERMINATED URETHANE CURED WITH A CARBOXYLIC ACID HYDRAZIDE
Erwin Windemuth, Leverkusen, and Fritz Kassack, Cologne-Stammheim, Germany, assignors to Farbenfabriken Bayer Aktiengesellschaft, Leverkusen, Germany, a corporation of Germany
No Drawing. Filed Feb. 20, 1961, Ser. No. 90,233
Claims priority, application Germany, Feb. 22, 1960, F 30,599
7 Claims. (Cl. 260—75)

This invention relates to polyurethane plastics and a method of preparing the same. More particularly, it relates to polyurethane plastics utilizing hydrazides as one of the reaction components.

It has been heretofore known to prepare polyurethane plastics by the isocyanate-polyaddition process to prepare high molecular weight linear or cross-linked plastics. Many different fibers, lacquers, adhesives, foam plastics and elastomers can be manufactured in this way. A characteristic feature of all of these processes in practice is that polyisocyanates react with complementary components containing hydroxyl groups or other active hydrogen containing groups with the formation of urethane groups.

It has also been heretofore known to react acid hydrazides with monomeric isocyanates. When equimolecular amounts of hydrazides and mono- or polyisocyanates are reacted, insoluble plastics results. Although these products are suitable for the manufacture of stiff fibers and films, they are unsuitable for the preparation of products having elastic properties.

It is, therefore, an object of this invention to provide improved polyurethane plastics utilizing hydrazides in the preparation. It is another object of this invention to provide an improved process for preparing polyurethane plastics based on hydrazides. It is still another object of this invention to provide improved polyurethane plastics which have elastic properties and which are not subject to the stiffness of the heretofore known urethanes based on hydrazides. It is a further object of this invention to provide polyurethane plastics and a method of preparing the same which plastics have good resistance to tropical atmospheric conditions.

The foregoing objects and others which will become apparent from the following description are accomplished in accordance with the invention, generally speaking, by providing polyurethane plastics and a method of preparing the same by reacting an excess of an organic polyisocyanate with an acid hydrazide with the proviso that when the organic polyisocyanate is monomeric, the carboxylic acid hydrazide has a molecular weight of at least 400, the reaction being completed simultaneously with shaping of the final product. Thus, the invention contemplates the reaction of an excess of an organic monomeric polyisocyanate with a carboxylic acid hydrazide having a molecular weight of at least 400 or the reaction of an organic polyisocyanate which is the reaction product of a monomeric polyisocyanate with an organic compound containing active hydrogen containing groups to form a prepolymer having terminal NCO groups with a carboxylic acid hydrazide which may or may not have a molecular weight of at least 400.

In the production of cross-linked plastics in accordance with this invention, the carboxylic acid hydrazides are combined with an excess of an organic polyisocyanate. The process will initially proceed through an intermediate stage characterized by the presence of the molecular grouping:

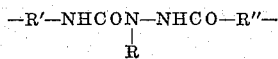

wherein R is hydrogen or an alkyl radical; R' is a carbon atom of an aliphatic, cycloaliphatic or aromatic bond and R" is the same as R' or an oxygen or SO$_2$ radical. The existing excess NCO groups are added to this molecular grouping by reacting with the hydrogen atoms.

Any suitable organic polyisocyanate may be used in the reaction of this invention such as, for example, aliphatic diisocyanates of the general formula:

in which $n$ is from 2 to 12, thiodiethyl diisocyanate, $\omega,\omega'$-dipropylether diisocyanate, thiodipropyl diisocyanate, 1,4-butyl glycol dipropylether-$\omega,\omega'$-diisocyanate, thiodihexyl diisocyanate, xylylene diisocyanates which can also be substituted in the nucleus, $\omega,\omega'$-diisocyanate-1,2-dimethyl cyclohexane, hydroaromatic diisocyanates such as cyclohexane-1,3-diisocyanate and cyclohexane-1,4-diisocyanate, 1 - methyl - cyclohexane-2,4-diisocyanate and 1-methyl-cyclohexane-2,6-diisocyanate as well as mixtures of both dicyclohexylmethane-4,4'-diisocyanate, aromatic-aliphatic and aromatic-hydroaromatic diisocyanates such as 4-phenyl isocyanate-methyl isocyanate, hexahydrodiphenyl-methane-4,4'-diisocyanate; also diisocyanates of benzene and its homologues such as 1,3- and 1,4-phenylene diisocyanate, 1-methyl benzene-2,4-diisocyanate and 1-methyl benzene-2,6-diisocyanate as well as mixtures of the two isomers, 1-methyl-3,5-diethyl-2,4-diisocyanate, diphenyl-ether-4,4'-diisocyanate, naphthalene-2,5-diisocyanate, diphenylmethane-4,4'-diisocyanate and triisocyanates such as 1-methyl-2,4,6-triisocyanate, triphenyl methane-4,4',4"-triisocyanate, isocyanates with more than two NCO groups and obtained by polymerization of aliphatic or aromatic diisocyanates according to German patent specification No. 1,013,869 and also biuret isocyanates obtainable by reaction of diisocyanates with water in accordance with Belgian Patent No. 578,071.

It is also possible to use mixtures of polyisocyanates and monoisocyanates in the practice of this invention. Any suitable monisocyanate may be used in admixture with polyisocyanates or in an initial step of the reaction with hydrazides such as, for example, aliphatic and hydroaromatic monoisocyanates such as, methyl, ethyl, allyl, propyl, n-butyl, $\alpha$-methyl-$\alpha$-ethylmethyl-isocyanate, dodecyl, oleyl, octadecyl, tertiarybutyl and cyclohexyl isocyanates; aliphatic monisocyanates substituted by chlorine cyanogen and ester groups such as

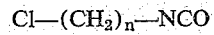

in which $n$ is from 2 to 7, 1-chloro-butyl propyl ether isocyanate, CN—(CH$_2$)$_n$—NCO in which $n$ is from 2–5, isocyanatoacetic acid ethyl ester, isocyanate-caproic acid methyl ester, alkoxy-propyl isocyanates of the general formula:

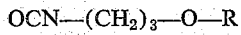

in which R is a linear or branched alkyl radical; aromatic monoisocyanates such as phenyl isocyanate, tolyl isocyanate, benzyl isocyanate, 2,4,6-trimethyl phenyl isocyanate, diphenyl methane-4-isocyanate, 3,4,6-trichloro-phenyl isocyanate, 1-methoxy-phenyl isocyanate, methyl-3-isocyanatobenzyl ether, 4-carbethoxy-phenyl isocyanate, 4-isocyanatobenzene and 1-naphthylisocyanate.

In one embodiment of the invention isocyanate-terminated prepolymers having resinous character are used in the preparation of this invention. Any suitable resinous compound containing terminal NCO groups may be used. Such compounds are prepared by reacting organic compounds containing active hydrogen containing groups in the molecule as determined by the Zerewitinoff method with an excess of organic polyisocyanates. These prepolymers should have a molecular weight of at least about 400 and preferably between about 1500 and about 3000. Any of the polyisocyanates mentioned above may be used for the reaction with the organic compound containing active hydrogen containing groups to prepare the NCO terminated resinous prepolymers.

Any suitable compound containing active hydrogen containing groups may be used in the reaction with an excess of an organic polyisocyanate to prepare NCO terminated prepolymers which may be reacted with the hydrazides in accordance with this invention such as, for example, polyols of the general formula:

$$HO-(CH_2)_n-OH$$

in which $n$ is an integer from about 2 to about 10 and including compounds such as, for example, propylene-1,2-glycol, propylene-1,3-glycol, butane-1,3-diol, butane-2,3-diol, butane-1,4-diol, pentane-1,5-diol, hexane-1,6-diol, 2-ethylhexane-1,3-diol, octadecane-2,12-diol, 2-butene-1,4-diol, 2-butyne-1,4-diol, 9,10-octadecene-1,12-diol, thiodiglycol, diethylene glycol, triethylene glycol, glycerine, hexane-1,2,6-triol, triethanol amine, pentaerythritol, quinitol, 4,4′-dihydroxy dicyclohexyldimethyl methane, N-methyl diethanol amine and the like. Also suitable are polyhydric phenols such as, for example, o-, m- and p-dihydroxybenzene, trihydroxybenzenes, 4,4′-dihydroxy diphenyl, dihydroxy diphenyl methane, 4,4′-dihydroxy diphenyl dimethyl methane.

Also suitable for the preparation of resinous isocyanate-terminated prepolymers are condensation products containing active hydrogen containing groups such as, for example, hydroxyl polyesters which also include polyesteramides, polyhydric polyalkylene ethers, polyhydric polythioethers, polyacetals and the like.

Any suitable linear or branched polyester having a molecular weight of at least 420, an hydroxyl number of from about 30 to about 420 and an acid number less than about 25 and prepared by the process which comprises reacting a polyhydric alcohol with a polycarboxylic acid may be used. Any of the polyhydric alcohols mentioned above may be used in the preparation of the polyester. Any suitable polycarboxylic acid may be used such as, for example, oxalic acid, malonic acid, succinic acid, glutaric acid, adipic acid, pimelic acid, ricinoleic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α-β-diethyl succinic acid, phthalic acid, isophthalic acid, terephthalic acid, tetrachlorophthalic acid, hemilellitic acid, trimellitic acid, trimesic acid, mellophanic acid, prehnitic acid, pyromellitic acid, benzenepentacarboxylic acid, 1,4-cyclohexanedicarboxylic acid, 3,4,9,10-perylenetetracarboxylic acid, dimeric or higher polymeric polycarboxylic acids prepared by the polymerization of unsaturated fatty acids as well as singly and severally unsaturated fatty acids also suitable in the preparation of polyesters are aminoalcohols, hydroxycarboxylic acids, aminocarboxylic acids, lactams, lactones and the like.

Any suitable polyalkylene ether may be used in the preparation of isocyanate-terminated resinous products in accordance with this invention such as the reaction product of any of the above-mentioned polyhydric alcohols with alkylene oxides such as, for example, ethylene oxide, propylene oxide, butylene oxide, amylene oxide, and the like. Of course, the polyhydric polyalkylene ethers can be prepared from other starting materials such as, for example, tetrahydrofuran, epihalohydrins such as, for example, epichlorohydrin and the like as well as aralkylene oxides such as, for example, styrene oxide and the like. The polyhydric polyalkylene ethers may have either primary or secondary hydroxyl groups and preferably are polyhydric polyalkylene ethers prepared from alkylene oxides having from two to five carbon atoms such as, for example, polyethylene ether glycols, polypropylene ether glycols, polybutylene ether glycols, and the like. It is often advantageous to employ some trihydric or higher polyhydric alcohols such as glycerine, trimethylol propane, pentaerythritol and the like in the preparation of the polyhydric polyalkylene ethers so that some branching exists in the product. Generally speaking, it is advantageous to condense from about 5 to about 30 mols of alkylene oxide per functional group of the trihydric or higher polyhydric alcohol. The polyhydric polyalkylene ethers may be prepared by any known process such as, for example, the process disclosed by Wurtz in 1859 and in Encyclopedia of Chemical Technology, vol. 7, pp. 257–262, published by Interscience Publishers, Inc. (1951) or in U.S. Patent 1,922,459. Compounds with molecular weights of from about 150 to about 2000 are preferred.

The addition of alkylene oxides to compounds containing other than only hydroxyl groups leads to usable polyhydroxyl compounds. Examples of such compounds include aliphatic, cycloaliphatic and aromatic monofunctional and polyfunctional amines such as, for example, ethylene diamine, propylene diamine, cyclohexane-2,4-diamine, xylylene diamine, cyclohexyl amine, aniline, phenylene diamine and the like; amino alcohols such as, ethanol amine, diethanol amine, propanol amine, polycarboxylic acid amides such as those prepared from any of the abovementioned carboxylic acids with polyamines mentioned polycarboxylic acids, hydroxy carboxylic acids and polycarboxylic acid sulphomides.

Any suitable polyhydric polythioether may be used such as, for example, the condensation product of thiodiglycol or the reaction product of a polyhydric alcohol such as is disclosed above for the preparation of the hydroxyl polyesters with any other suitable thioether glycol. Other suitable polyhydric polythioethers are disclosed in U.S. Patents 2,862,972 and 2,900,368.

Any suitable polyacetals may be used such as, for example, the reaction product prepared by reacting an aldehyde with a polyhydric alcohol. Any of the polyhydric alcohols mentioned above may be used. Any suitable aldehyde may be used such as, for example, formaldehyde polymers of formaldehyde, acetaldehyde, butyraldehyde and the like. The polyacetals described in German patent specification Nos. 1,039,744 and 1,045,095 are suitable for use in the preparation of the isocyanate-terminated resinous prepolymer in accordance with this invention. Any of these compounds containing active hydrogen containing groups when reacted with an excess of an organic polyisocyanate are suitable in the practice of this invention to prepare isocyanate-terminated resinous prepolymers.

As stated above when the polyisocyanate employed in the process of this invention is a resinous isocyanate-terminated prepolymer, the molecular weight of the hydrazide is not determinative and may be either one having a low molecular weight or one having a high molecular weight. The hydrazides, of course, are prepared by reacting carboxylic acids or carboxylic acid esters with hydrazine or hydrazine derivatives such as methyl hydrazine. Any suitable carboxylic acid may be used such as, for example, formic acid, acetic acid, propionic acid, butyric acid, isobutyric acid, valeric acid, isovaleric acid, lauric acid, undecylenic acid, palmitic acid, stearic acid, ethoxy acetic acid, n-propoxy acetic acid, cyanoacetic acid, phenyl acetic acid, β-phenyl propionic acid, γ-phenoxybutyric acid, phenoxyacetic acid, benzoic acid, tolylic acids, m-chlorobenzoic acid, p-bromobenzoic acid, o-, m- and p-nitrobenzoic acids, anisic acid, p-ethoxybenzoic acid, β-naphthoic acid and also carboxylic acids which are derived from the nitriles obtainable by further addition of alcohols to acrylonitrile and with subsequent saponification of said nitriles; also hydrazides which are derived from hydroxy acids and lactones, such as glycollic acid, lactic acid, butyrolactone, δ-valerolactone, hydroxycaproic acid and salicyclic acid; polycarboxylic acids such as, for example, malonic acid, alkylated malonic acids, succinic acid, substituted succinic acids, glutaric acid, adipic acid, sebacic acid, α-ethyl suberic acid, etherpolycarboxylic acid such as diglycollic acid, ethylene bis-glycollic acid from saturated polycarboxylic acids obtainable by diene synthesis with subsequent hydrogenation of the adducts and also from polycarboxylic acids which are obtained by saponification of nitriles which in their turn are obtained by addition of acrylonitrile to polyhydric alcohols, from sulphur-containing polycarboxylic acids such as, for example, thiodipropionic acid, 1,1'-butylidene-bis-thioglycollic acid and also from tartaric acid, citric acid, cyclopropane-1,2-dicarboxylic acid, cyclobutane-1,2-dicarboxylic acid, cyclopentane-1,3-dicarboxylic acid, cyclohexane-1,3- and cyclohexane-1,4-dicarboxylic acid and the like.

Of course, the corresponding esters of these acids may also be utilized in the preparation of the hydrazides suitable for use in this invention. Also, the hydrazides of sulfonic acids may be used in the practice of this invention such as, for example, benzene sulfohydrazide, toluylene sulfohydrazide and the like. Also suitable as the hydrazide in accordance with this invention is carbohydrazide, which is the bis-hydrazide of carbonic acid and thiocarbohydrazide. As stated above, the polyhydrazides having a molecular weight higher than 400 must be used when monomeric polyisocyanates are employed. Any carboxylic acid hydrazide can be used for this purpose provided that it has a molecular weight greater than 400 and at least two carboxylic acid hydrazide groups. Such carboxylic acid hydrazides can be prepared in the known manner by reacting the polycarboxylic acids having a molecular weight greater than 400 with alkyl pyro carbonates and thereafter reacting with hydrazine hydrate. Suitable polycarboxylic acids are for instance, polymers and copolymers of unsaturated carboxylic acids such as polyacrylic acid and polymethacrylic acid, further copolymers containing these acids such as the copolymers of acrylic acid and methacrylic acid with vinyl acetate, vinyl chloride, styrene and ethylene. Styrene and maleic acid-copolymers are also suitable. Another class of polycarboxylic acids which can be converted into the hydrazides useful in the present process, are the dimerisation products of unsaturated fatty acids with two double bonds such as the dimer acids of linoleic acid. Also the hydrogenation products of these dimer acids can be reacted with alkyl pyro carbonates and thereafter with hydrazine hydrate to give a polycarboxylic acid hydrazide. Still another class of suitable polycarboxylic acid hydrazides can be prepared by cyanoethylation, for instance, by adding acrylonitril to hydroxyl groups containing polyethers; subsequent saponification results in carboxylic groups. To give an example acrylonitril may be added to a polypropylene glycol and the product treated with alkali to give a polycarboxylic acid suitable for converting into the hydrazide. Another method for preparing polyethers with terminal carboxylic groups is to oxidize hydroxyl terminated polyethers such as polyethylene glycol or polytetrahydrofuran with nitric acid and ammonium vanadate as catalysts according to British Patent 634,496. The product prepared by splitting off water from polypropylene glycol ethers with the subsequent addition of carbon monoxide and water to the double bonds formed at the end of the polypropylene glycol ether in the presence of nickle carbonyl under high pressure resulting in polypropylene glycol ether carboxylic acids.

In the production of cross-linked plastics in accordance with this invention, the carboxylic acid hydrazides are combined with an exces of the organic polyisocyanate, the process will proceed throughout the intermediate stage set forth above in which existing excess NCO groups are added to this molecular grouping. In a single stage working procedure an organic polyisocyanate or polyisocyanate-terminated resinous prepolymer must always be present while minor amounts of monofunctional isocyanates may be concurrently employed. In another form of the invention the components can first be reacted in equivalent or in substantially equivalent quantities, that is, one NCO group will be reacted with each acid hydrazide group and subsequently an additional amount of isocyanate added to provide the required excess. Advantages are obtained in the preparation of some products such as coatings and the like by carrying out the addition of further quantities of isocyanates in the presence of solvents.

On the other hand, if isocyanate-modified resinous prepolymers having a high molecular weight such as, for example, one obtained by reacting a linear polyester having terminal hydroxyl groups and a molecular weight of about 2000 with an excess of hexamethylene diisocyanate such that the NCO to OH ratio is about 2, is reacted with a carboxylic acid hydrazide prepared by reacting a monocarboxylic acid with hydrazine, a pasty reaction product is obtained which can be further processed without the use of solvents in a kneader or on other suitable apparatus. The same is true when polycarboxylic acid hydrazides having a molecular weight higher than 400 and prepared in the manner set forth above are reacted with monomeric polyisocyanates.

The reaction products obtained by the different variations possible in this process all contain the molecular grouping heretofore set forth and yet can have widely varying properties. These products are then reacted at the same time they are given their final physical shape with an additional quantity of a polyisocyanate which may or may not be of a resinous nature so an excess of NCO groups is present, thus resulting in cross-linked plastics having widely differing properties.

Generally speaking, in the second phase of the reaction leading to final cross linking, one NCO group is used for each of the molecular groupings set forth above which groups are present in the reaction product of the isocyanate and hydrazide. Special effects can be achieved by slight deviations from this amount. If the one step process is followed the excess of isocyanate should be such that 3 to 4 NCO groups are provided for each hydrazide group. It is possible to use less isocyanate if a product is desired which is not completely cross-linked. To use more than the indicated amount of isocyanate will not produce specific effects. If the two step process is followed, an equivalent amount of isocyanate is employed in the first step, in other words a NCO group provided for each hydrazide group. Then, in the second step 2 to 3 NCO groups for each hydrazide group are preferably added. Both procedures can be performed in solution, if desired. Suitable solvents are for instance, ethyl acetate, dimethyl ether, formamide, dimethyl formamide, methylene chloride, dioxan, tetrahydrofuran or 1,3-dioxolane. Ketones should not be employed, since they react with hydrazides. The reaction of the NCO groups with the hydrazide groups proceeds at room temperature or at elevated temperature up to 100° C. The cross-linking reaction by the excess of isocyanate groups proceeds preferably at elevated temperatures of from about 100° C. to about 200° C. within a few minutes. Therefore, if the two step process is followed, the first step runs at room temperature or up to 100° C. The second step is then performed at the indicated higher temperature. If the one step process is followed reaction will be started at room temperature and then the temperature raised to effect cross-linking.

The reaction time can be shortened by using activators. Any suitable activator may be used such as, for example, tertiary amines including triethylene diamine, N-methyl morpholine, N-ethyl morpholine, diethyl ethanol amine, N-coco-morpholine, 1 - methyl - 4 - dimethyl amino ethyl piperazine, 3-methoxy-N-dimethyl propyl amine, N-dimehtyl-N'-methyl isopropyl propylene diamine, N,N-diethyl-3-diethyl amino propyl amine, dimethyl benzyl amine and the like; inorganic or organic compounds or methyl compounds with an alkaline reaction including alkyl-substituted tin compounds such as tin dibutyl dilaurate, tin-II-octoate and the like.

Substances which split off isocyanate groups that is, compounds which at relatively high temperatures form free isocyanate groups may also be used to carry out the cross linking reaction. Dimerization products of aromatic isocyanates may also be used in the cross-linking step as these dimers also split out isocyanates at high temperatures.

The products in accordance with this invention exhibit properties heretofore unknown in the field of polyurethane chemistry because of the intermolecular forces which are developed within the cross-linked plastics due to the novel principle of synthesis of this invention.

The products in accordance with this invention have good resistance to temperature, high stability with respect to weather influences, good resistance to tropical conditions and as compared with cross-linked polyurethane plastics known heretofore, a vast improvement in sunlight or artificial ultraviolet light with respect to color.

The products obtained in accordance with this invention can be used for many different purposes. They may be produced in the form of adhesives and coatings for supporting materials of all types and also for lacquers for coating wires. The products are also applicable in the preparation of elastomeric materials. These may be formed into various shapes depending upon the desired end use. The elastomeric products may be used as bearings, bushings, gears, shock absorbers and the like.

The invention is further illustrated by the following examples in which parts are by weight unless otherwise specified.

Example 1

About 940 parts of a polyester of adipic acid and diethylene glycol having an hydroxyl number of about 46.6, an acid number of about 1.2 and about 40 parts of octadecane-1,12-diol and about 20 parts of trimethylol propane are dissolved in about 391 parts of ethyl acetate, and a mixture of about 74 parts of hexamethylene diisocyanate and about 100 parts of toluylene diisocyanate (isomer ratio 65:35) is added thereto. The reaction mixture is heated to about 80° C. for three hours while stirring and with exclusion of moisture an isocyanate-containing reaction product having an NCO content of about 1.48% and a viscosity of about 1100 c.p./75° is obtained. While mixing well, this solution has added thereto, at about 50 to 60° C., a solution of about 41 parts of acethydrazide in about 129 parts of ethyl acetate heated to the same temperature. With a moderate exothermic reaction, the reaction mixture at once becomes cloudy with a simultaneous rise in viscosity to produce a viscous mass.

About 100 parts of the viscous mass prepared above are mixed with about 17.5 parts of a 75% solution of ethylacetate of a polyisocyanate obtained from 1 mol of trimethylol propane and 3 mols of toluene diisocyanate. The mixture is applied to a glass plate in a thin layer and, after evaporation of the solvent, is heated for 5 minutes at 160° C. A crystal-clear, cross-linked elastic film is formed, which is insoluble in the conventional organic solvents.

If the combination is applied to other support materials, such as, for example, textiles, by means of a doctor, and similarly heated for 5 minutes at 160° C., a high-quality textile coating is obtained.

Example 2.—Production of the starting material

About 293 parts of hydrogenated dimerized linseed oil fatty acid are mixed with about 56 parts of hydrazine hydrate and heated under reflux for about 10 hours in a nitrogen atmosphere. With unchanged external heat supply, the temperature of the reaction mixture falls from about 135° C. to about 98° C. The volatile fractions are now removed at a bath temperature of about 100° C. under a vacuum of about 14 mm. Hg and finally about 0.2 mm. Hg. A transparent reaction product solidifying into a solid mass at room temperature is left.

About 14.5 parts of ethyl isocyanate, dissolved in about 56 parts of glycol monomethyl ether acetate, are slowly added to about 107 parts by weight of a 60% solution in ethyl acetate of the hydrazide of the hydrogenated linseed oil fatty acid, so that the temperature does not exceed about 40° C., a milky solution is formed and about 60 parts of the 75% solution of the polyisocyanate mentioned in Example 1 is added thereto. If this reaction mixture is applied in a thin layer to a glass sheet and heated for about 8 minutes to about 160° C., a transparent cross-linked plastic film is formed, which adheres very firmly to the support and is for this reason very suitable as an adhesive.

Example 3

About 1000 parts of a branched polypropylene glycol ether having an hydroxyl number of about 56 and obtained by adding propylene oxide to trimethylol propane are mixed with about 168 parts of hexamethylene diisocyanate and heated for about 4 hours at about 130° C. An isocyanate-containing reaction product having an NCO content of about 3.5% is obtained. About 400 parts of this polypropylene glycol ether isocyanate are introduced into a kneader and about 32.6 parts of a 90% solution of propionic acid hydrazide in dimethyl formamide are added thereto at room temperature. In a short time, with an increase in viscosity, a milky cloudy thick paste is formed with a simultaneous rise in temperature to about 20° C. The contents of the kneader are now heated to between about 70 to 80° C. and about 91.2 parts of a polyisocyanate having an NCO content of about 18.4% and obtained from 1 mol of trimethylol propane and 3 mols of toluylene diisocyanate are added. After about 15 minutes, a homogeneous mass has formed, which is pressed at a pressure of about 30 kg./cm.² for about 15 minutes at about 160° C. A flexible, substantially colorless and transparent sheet is obtained which is insoluble in solvents. A more or less strong swelling occurs when it is kept in solvents. Strong swelling is observed with chloroform, methylene chloride, tetrahydrofuran, chlorobenzene, dimethyl formamide, carbon tetrachloride and toluene; moderately strong swelling with acetone, ether, ethyl alcohol, methyl alcohol, n-propyl alcohol, ethyl acetate, butyl acetate, benzene, xylene and cyclohexanol and a small degree of swelling with aliphatic hydrocarbons, water and formamide.

Example 4

A mixture of about 950 parts of a polyester of adipic acid and diethylene glycol having an hydroxyl number of about 46.6 and about 50 parts of octadecane-1,12-diol, dissolved in about 381 parts of ethyl acetate, is reacted with about 90 parts of toluylene diisocyanate and about 52.3 parts of hexamethylene diisocyanate. After a heating period of about 2½ hours at about 85° C., an isocyanate-containing reaction product with an NCO content of 1.42% is formed.

About 114 parts of ethyl acetate and a solution of about 13.9 parts of thiodipropionic acid bis-hydrazide in about 50 parts by weight of ethyl acetate and about 50 parts of formamide are added to about 400 parts of the reaction product. The temperature of the two components at the time they are combined is between 50 and 60° C. After a few minutes, a highly viscous and substantially opaque mass is formed. About 100 parts of this mass is mixed with 15 parts of a 75% solution in ethyl acetate of a polyisocyanate obtained from 1 mol of trimethylol propane and 3 mols of toluylene diisocyanate. This mixture is applied in a thin layer to a support and, after evaporation of the solvent and after heating for about 5 minutes at about 150° C., a cross-linked transparent film which is insoluble in organic solvents is formed.

It is, of course, to be understood that other material set forth throughout the specification may be utilized in place of the ingredients used in the examples and that the scope of the invention is not to be limited by the examples.

Although the invention has been described in considerable detail for the purpose of illustration, it is to be understood that variations may be made therein by those skilled in the art without departing from the spirit of the invention and the scope of the claims.

What is claimed is:

1. A process for preparing polyurethane plastics which comprises reacting a carboxylic acid hydrazide with an excess of an organic polyisocyanate, said organic polyisocyanate being a resinous isocyanate-terminated prepolymer having a molecular weight of at least 400 and prepared by the process which comprises reacting a monomeric organic polyisocyanate with an organic compound containing active hydrogen containing groups as determined by the Zerewitinoff method which are reactive with isocyanate groups.

2. A process for preparing polyurethane plastics which comprises reacting a carboxylic acid hydrazide with an excess of an organic polyisocyanate, said organic polyisocyanate being a resinous isocyanate-terminated prepolymer having a molecular weight of at least 400 and prepared by the process which comprises reacting a monomeric organic polyisocyanate with an organic compound containing active hydrogen containing groups as determined by the Zerewitinoff method and selected from the group consisting of polyhydric alcohols, polyhydric phenols, hydroxyl polyesters prepared by the process which comprises reacting a polyhydric alcohol with a polycarboxylic acid, polyhydric polyalkylene ethers, polyhydric polythioethers and polyacetals.

3. A process for preparing polyurethane plastics which comprises reacting a resinous organic polyisocyanate prepolymer having a molecular weight of at least 400 and prepared from an hydroxyl polyester having an hydroxyl number of from about 30 to about 420 and an excess of an organic polyisocyanate with a carboxylic acid hydrazide in the first step and cross-linking the product of said first step with a further amount of an organic polyisocyanate while simultaneously imparting the desired final shape thereto, the total amount of isocyanate present being in excess of that required to react with the carboxylic acid hydrazide.

4. A polyurethane plastic prepared by the process of claim 1.

5. A process for preparing polyurethane plastics which comprises reacting in equivalent amounts a resinous isocyanate-terminated prepolymer having a molecular weight of at least 400 and prepared by reacting a monomeric organic polyisocyanate with a member selected from the group consisting of polyhydric alcohols, polyhydric phenols, hydroxyl polyesters prepared by the process which comprises reacting a polyhydric alcohol with a polycarboxylic acid, polyhydric polyalkylene ethers, polyhydric polythioethers and polyacetals; with a carboxylic acid hydrazide in a first step and reacting the product of said first step with a further quantity of an organic polyisocyanate.

6. A process for preparing polyurethane plastics which comprises reacting a carboxylic acid hydrazide with a resinous isocyanate-terminated prepolymer having a molecular weight of at least 400 and prepared by reacting an excess of a monomeric organic polyisocyanate with an organic compound containing active hydrogen containing groups as determined by the Zerewitinoff method which are reactive with NCO groups, said resinous isocyanate-terminated prepolymer being present in a quantity such that from 3 to 4 NCO groups are provided for each hydrazide group.

7. A process for preparing polyurethane plastics which comprises reacting in a first step, equivalent amounts of a carboxylic acid hydrazide and a resinous isocyanate-terminated prepolymer having a molecular weight of at least 400 and prepared by reacting an excess of a monomeric organic polyisocyanate with an organic compound containing active hydrogen containing groups as determined by the Zerewitinoff method which are reactive with NCO groups and reacting the product of said first step with an amount of an organic polyisocyanate such that from 2 to 3 NCO groups are provided for each hydrazide group.

References Cited by the Examiner

UNITED STATES PATENTS 2,956,986 10/60 De Witt _____ 260—77.5
3,004,945 10/61 Farago _____ 260—77.5

LEON J. BERCOVITZ, *Primary Examiner.*

HAROLD N. BURSTEIN, *Examiner.*